US006643311B2

(12) United States Patent
Krupke

(10) Patent No.: US 6,643,311 B2
(45) Date of Patent: Nov. 4, 2003

(54) DIODE-PUMPED ALKALI LASER

(76) Inventor: William F. Krupke, 1564 Foothill Rd., Pleasanton, CA (US) 94588

( * ) Notice: Subject to any disclaimer, the term of this patent is extended or adjusted under 35 U.S.C. 154(b) by 0 days.

(21) Appl. No.: 10/000,508

(22) Filed: Oct. 23, 2001

(65) Prior Publication Data

US 2003/0099272 A1 May 29, 2003

(51) Int. Cl.[7] .............................. H01S 3/22; H01S 3/223
(52) U.S. Cl. ............................................................. 372/56
(58) Field of Search .............................. 372/56, 5, 73, 372/66

(56) References Cited

U.S. PATENT DOCUMENTS

| | | | | |
|---|---|---|---|---|
| 3,816,754 A | * | 6/1974 | Hodgson et al. | 307/88.3 |
| 3,892,979 A | * | 7/1975 | Hodgson et al. | 307/88.3 |
| 4,151,486 A | * | 4/1979 | Itzkan et al. | 331/94.5 |
| 4,807,240 A | | 2/1989 | Goldstone et al. | |
| 5,283,800 A | * | 2/1994 | Suzuki et al. | 372/60 |
| 5,289,481 A | | 2/1994 | Xie et al. | |
| 5,327,105 A | * | 7/1994 | Liberman et al. | 331/94.1 |
| 6,160,934 A | | 12/2000 | Beach et al. | |
| 6,167,068 A | * | 12/2000 | Caprara et al. | 372/22 |
| 6,331,993 B1 | | 12/2001 | Brown | 372/55 |

OTHER PUBLICATIONS

Z. Konefal and M. Ignaciuk; Stimulated Collision Induced Processes In Sodium Vapor In The Presence Of Helium; May 11, 1990; Applied Physics B, Photo–physics And Laser Chemistry.*

Stephen Anderson, "Review and Forecast of the Laser Markets; Part I: Nondiode Lasers", Laser Focus World, PennWell Publishers, Jan., 2001.

Peter Loosen, "Lasers in Materials Processing", Advances in Lasers and Applications, pp287–317, Proc. 52nd Scottish Univ. Summer School in Physics, St. Andrews, Sep. 1998.

W. Schulz and R. Poprawe, "Manufacturing with Novel High–Power Diode Lasers", IEEE J. Selected Topics in Quantum Electronics, 6, 696 (2000).

M. S. Albert and D. Balamore, "Development of Hyperpolarized Noble Gas MRI", Nuclear Instruments and Methods in Physics Research, A402, 441 (1998).

I. A. Nelson, B. Chann, and T. G. Walker, "Spin–exchanged Optical Pumping Using a Frequency–Narrowed, HighPower Diode Laser", Appl. Phys. Lett., 76, 1356 (2000).

H. Treusch, et. al., "compact High Brightness and High Power Diode Laser Source for Materials Processing", SPIE, 3945, 23 (2000).

G. Schmidt, et. al., "New Diode Pumped Multi kW Solid State Laser– Modeling of the Performance in Comparison with Experimental Results", SPIE, vol. 3613, pp8–15, (1999).

(List continued on next page.)

*Primary Examiner*—Paul Ip
*Assistant Examiner*—Leith A Al-Nazer
(74) *Attorney, Agent, or Firm*—John P. Wooldridge

(57) ABSTRACT

A new class of lasers is provided that can be pumped by conventional high-power, multi-mode, broadband 1-D and 2-D laser diode arrays, where the pumped laser gain medium comprises an atomic vapor of one the alkali elements (Li, Na, K, Rb or Cs), buffered with a mixture of rare-gas (He, Ar, Kr, Ne or Xe) and selected molecular gases. The alkali atom gain medium is pumped at a wavelength matching the wavelength of the $^2S_{1/2}$–$^2P_{3/2}$ electric-dipole-allowed transition (the $D_2$ transition). After kinetic relaxation of pump excitation to the excited $^2P_{1/2}$ electronic level, laser emission takes place on the $^2P_{1/2}$–$^2S_{1/2}$ transition (the $D_1$ transition).

25 Claims, 2 Drawing Sheets

OTHER PUBLICATIONS

P. S. Diodge, "A Compendium and Critical Review of Neutral Atom Resonance Line Oscillator Strengths for Atomic Absorption Analysis", Spectrochmica Acta., 50B, 209 (1995).

S. Ch'en and M Takeo, "Broadening and Shift of Spectral Lines Due to the Presence of Foreign Gases", Rev. Mod. Phys., 29, 20 (1957).

W. R. Hindmarsh and J. M. Farr, "Collision Broadening of Spectral Lines by Neutral Atoms", Prog. In Quantum Electronics, 2, 141 (1972).

R. O. Garrett and S. Y. Ch'en, "Pressure Effects of Foreign Gases on the Absorption Lines of Cesium. II. The Effects of Helium on the First Two Members of the Principal Series", Phys. Rev., 144, 66 (1966).

M. D. Rotondaro and G. P. Perram, "Collisional Broadening and Shift of the Rubium $D_1$ and $D_2$ Lines by Rare Gases, $h_2$, $D_2$, $N_2$, $CH_4$, and $CF_4$", J. Quant. Radiat. Transfer, 57, 497 (197).

L. Krause, "Collisional Excitation Transfer Between the $^2P_{1/2}$ and $^2P_{3/2}$ Levels in Alkali Atoms", Applied Optics, 5, 1375 (1966).

E. S. Hrycyshyn and L. Krause, "Inelastic Collisions Between Excited Alkali Atoms and Molecules, VII. Sensitized Fluorescence and Quenching in Mixtures of Rubidium with $H_2$, HD, $D_2$, $n_2$, $CH_4$, $CD_4$, $C_2H_4$, and $C_2H_6$.", Can. J. Phys., 48, 2761 (1970).

E. Walentynowicz, et. al., "Inelastic Collisions Between Excited Alkali Atoms and Molecules X. Temperature Dependence of Cross Sections for $^2P_{1/2}-^2P_{3/2}$ Mixing in Cesium, Induced in Collisions with Deuterated Hydrogens, Ethanes, and Propanes", Can. J. Phys., 52, 589 (1974).

Z. Konefal, "Observation of Collision Induced Processes in Rubium–Ethane Vapour", Optics Communications, 164, 95 (1999).

E. Spellier et al, "Quenching Cross Sections for Alkali–Inert Gas Collisions", Z. Phys., A291, 311 (1979).

B. A. Glushko et al. "Processes of Stimulated Electronic Raman Scattering and Stimulated Resonance Emission in Potassium Vapor in the Presence of a Buffer Gas". Opt. Spectrosc (USSR), 52, 458 (1982).

A. A. Dabagyan et al., "Stimulated Processes in Potassium Vapor in the Presence of a Buffer Gas", Sov. Phys., JETP, 58, 700 (1983).

A. A. Dabagyan et al., "Development over time in the Induced Resonant Processes in Potassium Vapor, in the Presence of Collisions", Izvestiya Alademii Nauk, SSR, Seriya Fizicheskaya, 47, 1609 (1983).

S. N. Atutov, A.I. Plekhanov, and A. M. Shalagin, "Superluminosity on the Resonant Transition of Na Atoms under Optical Excitation", Opt. Spectrosc (USSR), 56, 134 (1984).

M. E. Movsesyan, T. O. Ovakimyan, and S. V. Shmavonyan, "Stimulated Processes in a Mixture of Rubidium Vapor and Buffer Gas Under Two Photon Excitation", Opt. Scpetrosc (USSR), 61, 285 (1986).

J. Czub, J. Fiutak, and W. Miklaszewski, "On Collision–Induced Amplified Emission of Alkali Atoms", Z. Phys., D3, 23 (1986).

A. M. Davtyan, M. E. Movsesyan, A. V. Papoyan, and S. V. Shmavonyan, "Laser Resonance Radiation at the Atomic–Potassium D1 Line", Opt. Spectrosc (USSR), 66, 686 (1989).

Z. Konefal and M. Ignaciuk, "Stimulated Collision Induced Processes in Sodium Vapor in the Presence of Helium", Appl. Phys., B51, 285 (1990).

Z. Konefal and M. Ignaciuk, "Observation of Collision–Induced Amplified Emission in Na–Noble–Gas System", Z. Phys., D27, 49 (1993).

Z. Konefal and M. Ignaciuk, "Investigation of collisionally Induced Stimulated Scattering in Sodium Vapor with Temporal and Spectral Resolution", Appl. Phys., B61, 101 (1995).

J. Czub, J. Fiutak, and W. Miklaszewski, "Influence of Resonant Pulse Propagation on Collision–Induced Stimulated Effects in the $^2S_{1/2},-^2P_{1/2/,3/2}$ System", Phys. Rev., A54, 746 (1996).

Z. Konefal and M. Ignaciuk,l "Stimulated Processes in Sodium Vapor in the Presence of Molecular Buffer Gas Systems", Opt. And Quantum Electronics, 28, 169 (1996).

R. J. Beach, "CW Theory of Quasi–Three–Level End-Pumped Laser Osillators", Opt. Commun., 123, 385 (1995).

* cited by examiner

DIODE-PUMPED ALKALI LASER

BACKGROUND OF THE INVENTION

1. Field of the Invention

The present invention relates to high power lasers, and more specifically, it relates to diode-pumped alkali vapor lasers.

2. Description of Related Art

The largest market currently for high-power (>kilowatt) lasers is for the materials processing applications of sheet-metal cutting and welding [1].

Application end-users continue to call for multi-kilowatt lasers with near-diffraction-limited output beam quality, wavelengths of <1060 nm, higher efficiency and compactness, and decreased cost-of-ownership, compared to traditional lamp-pumped Nd:YAG solid state lasers and electrically-pumped $CO_2$ gas lasers [2].

The near-diffraction-limited (i.e., $M^2$<2 or 3, where $M^2$ is the times-diffraction-limit factor) feature provides for greater intensity on the work-piece, for a focusing lens having a given f/number. Shorter wavelengths in general result in enhanced absorption efficiency in most metals and allow for power delivery to the work piece by optical fiber. Higher efficiency and compactness generally lead to low cost of ownership.

The direct use of high-power 2-D laser diode arrays for material processing applications has been of great interest in the past few years [3]. However, the output beam of a high-power (60 watt) linear bar array of laser diodes is typically >1000 times the diffraction limit, and that of a 2-D stack of bar array is typically more than several thousand times the diffraction limit [4]. Spectral widths of diode arrays are typically several nm wide. Some applications, such as spin-polarizing Xe gas for use in medical applications [4], could benefit from having available diode arrays with considerably narrower spectral widths. Efforts continue to narrow spectral width [5] and improve beam quality [6] of 1-D and 2-D laser diode arrays, but cost effective methods appear to be complex and expensive.

An alternative means of effectively improving the beam quality and/or spectral width of highly multi-mode 1-D and 2-D laser diode arrays is to use them to pump another laser, whose output beam can be extracted in a low order spatial mode (e.g., near-diffraction-limited, or $M^2$=2 or 3), and with a greatly reduced spectral width. In effect the pumped laser becomes a "spatial and spectral brightness converter", trading a small loss in energy efficiency for a much greater gain in beam quality and spectral narrowness. The diode-pumped solid-state laser (DPSSL) is such a brightness converter. Nd:YAG DPSSLs have been developed recently that exhibit increased efficiency and beam quality compared to traditional lamp pumped devices [4].

Notwithstanding the reduced (~⅓) thermal loading realized by diode pumping (compared to lamp pumping), practical, near-diffraction-limited, multi-kilowatt Nd:YAG DPSSLs have remained elusive because of severe thermally induced focusing and stress-birefringence [7] present in solid state laser hosts, such as YAG.

In light of the foregoing, the need continues for a cost-effective solution for an efficient, compact, multi-kilowatt, near diffraction-limited, narrow-spectral-band laser source emitting at wavelengths <1060 nm.

SUMMARY OF THE INVENTION

It is an object of the present invention to provide an alkali vapor laser.

It is an object of the present invention to provide an alkali vapor laser having laser diode array pumping mechanism for pumping an optical cell that include an alkali vapor selected from the group consisting of cesium (Cs), rubidium (Rb), potassium (K), sodium (Na), and lithium (Li).

Another object of the invention is to include a buffer gas in an alkali vapor optical cell, where the buffer gas is selected from the group consisting of rare gases and light molecular gases.

Still another object of the invention is to include in an alkali vapor optical cell the rare gases of xenon, krypton, argon, neon, and/or helium.

An object of the invention is to include in an alkali vapor optical cell the light molecular of hydrogen, methane, ethane, propane, and/or their deuterated analogues.

An object of the invention is to provide a means for off-axis coupling of linearly-polarized radiation from a pump laser into an alkali vapor gain medium, where the linearly-polarized radiation couples into the gain medium without passing through the input mirror.

Another object of the present invention is to provide an alkali vapor laser where laser radiation at wavelength $\lambda_1$ is generated in a linear polarization orthogonal to the pump radiation.

Another object is to provide a method for converting spectrally broadband radiation from a pump semiconductor diode laser array into spectrally narrowband output laser radiation from an alkali/buffer-gas gain mixture.

Still another object is to provide a method for converting the substantially divergent, multi-spatial-mode of semiconductor diode laser array pump radiation into a near diffraction-limited, near-single-spatial-mode, coherent laser radiation from an alkali/buffer-gas gain mixture.

These and other objects will be apparent to those skilled in the art based on the teachings herein.

The present invention provides an efficient, compact, high-power, near diffraction-limited laser source emitting at a wavelength <1060 nm. The invention is a new class of lasers that can be pumped by conventional high-power, multi-mode, broadband 1-D and 2-D laser diode arrays, where the pumped laser gain medium comprises an atomic vapor of one the alkali elements (Li, Na, K, Rb or Cs), buffered with a mixture of rare-gas (He, Ar, Kr, Ne or Xe) and selected molecular gases. Given the central role of the alkali atomic vapor as the active laser entity, this new type of laser is herein designated as the diode-pumped alkali laser (DPAL).

The three lowest-lying electronic levels of the alkali atom are utilized in the present DPAL designs, which is a classic "three level laser". In the DPAL laser, the alkali atom gain medium is pumped at a wavelength matching the wavelength of the $^2S_{1/2}-^2P_{3/2}$ electric-dipole-allowed transition (the $D_2$ transition). After kinetic relaxation of pump excitation to the excited $^2P_{1/2}$ electronic level, laser emission takes place on the $^2P_{1/2}-^2S_{1/2}$ transition (the $D_1$ transition).

In DPAL operation, pump radiation centered at the pump wavelength $\lambda_p$ of the $D_2$ transition, is directed into a gain cell containing alkali atoms and buffer gases. The alkali atoms in the gain cell are selectively pumped to the $D_2$ transition, whereupon they collisionally relax to the lower-lying $D_1$ transition before they can radiatively decay back to the ground level. The buffer gas also serves to collisionally broaden the alkali D-transitions.

The $D_2$ transitions for Cs, Rb, and K lie in the spectral region (760–850 nm) for which powerful and efficient high power laser diode arrays are commercially available. Therefore, these particular alkali atoms are utilized in preferred DPAL embodiments.

A basic DPAL device configuration takes the form of an "end-pumped" configuration, accommodating the fact that a DPAL is a true three-level laser. In these designs the DPAL active medium is contained within a cell, which is fitted with flat optical windows at either end to contain the alkali atomic vapor. The window at the pump end of the apparatus is coated on the exterior surface with a multilayer dielectric stack to form a mirror of the laser cavity. This mirror coating provides high transmission at the pump wavelength $\lambda_p$ and high reflectivity at the laser wavelength, $\lambda_1$. The window at the other end of the cell (away from the laser diode pump array and pump light coupling lens) is coated on its exterior surface with an anti-reflection layer for both pump and laser wavelengths. The laser cavity is completed with a second mirror placed along the axis of the gain cell. This mirror is configured to permit only the fundamental (or other desired low-order) spatial mode of the resonator to oscillate. The output mirror is coated to have a high reflectivity at the pump wavelength, to reflect pump radiation that was not absorbed during a first pass through the cell to return generally parallel to the cell axis for a second pass. The coating on the output mirror is also designed to provide a reflectivity at the laser wavelength that optimizes the output coupling of laser radiation generated within the gain cell, and maximizes the efficiency of the DPAL.

To energize the DPAL, pump radiation provided by a laser diode pump array having a wavelength centered at the $D_2$ transition is coupled by a lens into the gain cell generally along the cell axis, through the end mirror on the cell, and double-passed through the cell following reflection from the high reflectivity mirror placed at the other end of the gain cell. Laser radiation generated within the gain cell at the wavelength matching the wavelength of the $D_1$ transition is extracted through the partially transmitting output mirror.

An alternative preferred DPAL embodiment has a thin-film polarizer that is inserted between the diode pump array and the alkali gain cell. The cell windows are AR coated on their exterior surfaces to maximize transmission at pump and laser wavelengths. Polarized pump radiation is coupled into the apparatus by passing through the thin-film plate polarizer with high transmission, and is focused within the cell to provide good spatial overlap with a low-order spatial mode of the laser cavity. The laser cavity is formed between the highly reflecting (at pump and laser wavelengths) mirror and the output coupling mirror. Laser action in the pumped cell is set up in a polarization perpendicular to that of the pump radiation due to the presence of the thin-film plate polarizer within the laser cavity.

In another DPAL embodiment, the radiation from a 2-D laser diode pump array is coupled into the gain cell using a hollow lens-duct. An unstable laser cavity is formed by a dot-mirror placed in the center of a cell window. An anti-reflection coating is placed on the cell window in the annular region surrounding the high-reflectance dot mirror. Pump radiation is coupled into the gain cell in this annular region and propagates through the cell reflecting from a mirror coating placed on the outer barrel of the transparent-walled cell.

Many other embodiments for DPAL type devices will be obvious to those skilled in the art based on the teachings herein. Spectrally narrow laser operation can be further enhanced by incorporating a birefringent filter (BRF) within the laser cavity. Unexpectedly high pump power absorption efficiency can be realized in a DPAL device because it proves possible to effectively couple much of the pump power into the alkali atoms through the Lorentzian wings of the pump transition.

DETAILED DESCRIPTION OF THE INVENTION

Figure 1:
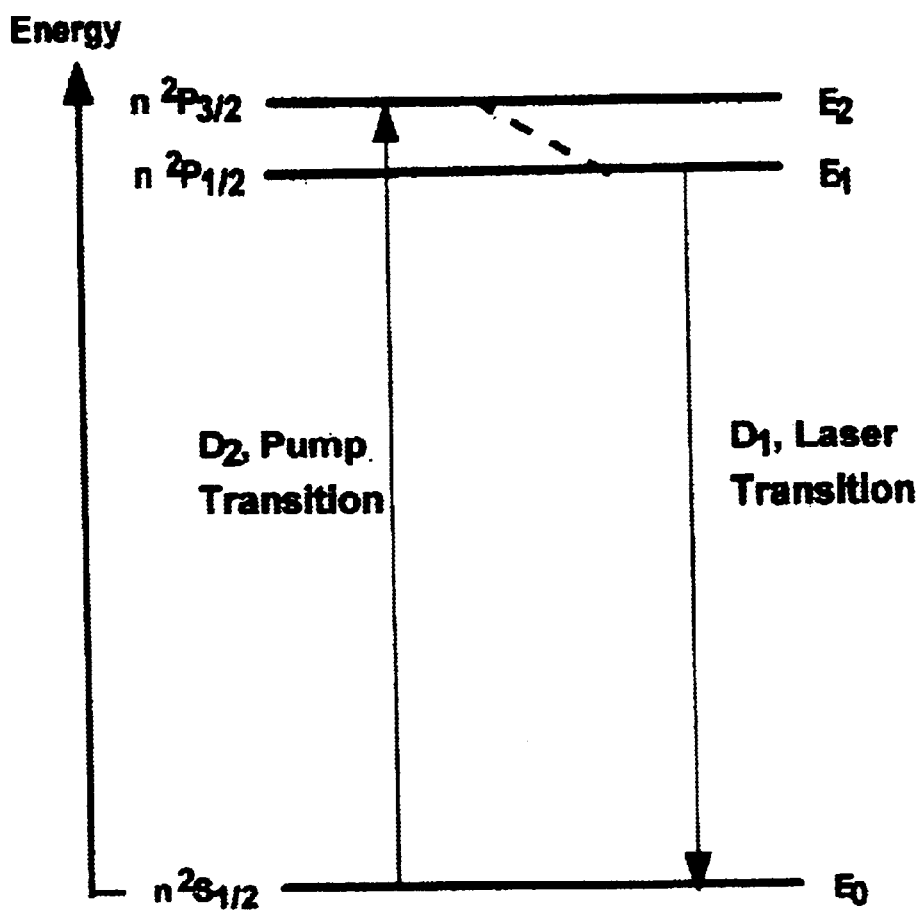
FIG. 1 shows the ground $^2S_{1/2}$ and first two excited $^2P_{1/2;3/2}$ electronic energy levels of the alkali atoms.

The basic energy level scheme of the DPAL class of lasers is shown in FIG. 1. Only the three lowest-lying electronic levels of the alkali atom are utilized in the present DPAL designs; the $^2S_{1/2}$ ground electronic level, and the first two $^2P$ electronic levels, $^2P_{1/2}$, and $^2P_{3/2}$. These levels form a classic pure "three-level-laser" scheme. In FIG. 1, n stands for the principal quantum number for the ground configuration of each alkali atom (Cs: n=6; Rb: n=5; K: n=4; Na: n=3; Li: n=2). In the DPAL laser, the alkali atom gain medium is excited (pumped) at a wavelength matching the wavelength of the $^2S_{1/2}-^2P_{3/2}$ electric-dipole-allowed transition (conventionally called the $D_2$ transition). After kinetic relaxation of pump excitation to the excited $^2P_{1/2}$ electronic level, laser emission takes place on the $^2P_{1/2}-^2S_{1/2}$ transition (conventionally called the $D_1$ transition). The energy splitting of the $^2P$ electronic level, divided by the energy of the $^2P_{3/2}$ level, is defined as the quantum energy defect, and is a measure of the minimum waste energy required to produce an excited $^2P_{1/2}$ upper laser level excitation in a DPAL device. Table 1 summarizes the level energies (E1 and E2 for the $n^2P_{1/2}$ and $n^2P_{3/2}$ levels, respectively), the energy difference $\Delta E = E2 - E1$, the wavelengths of the $D_2$ (pump) and $D_1$ (laser) transitions, and the quantum energy defects for the alkali atoms.

TABLE 1

| n | Alkali | E1 (cm$^{-1}$) | E2 (cm$^{-1}$) | $\Delta E$ (cm$^{-1}$) | $\lambda_p$ (nm) | $\lambda_1$ (nm) | $\Delta E/E2$ |
|---|--------|---------------|----------------|------------------------|------------------|------------------|---------------|
| 6 | Cs | 11,178.2 | 11,732.4 | 554.1 | 852.1 | 894.3 | 0.047 |
| 5 | Rb | 12,578.9 | 12,816.4 | 237.5 | 780.0 | 794.8 | 0.0185 |
| 4 | K  | 12,985.2 | 13,042.9 | 57.7 | 770.1 | 766.9 | 0.0044 |
| 3 | Na | 16,956.2 | 16,973.4 | 17.2 | 589.2 | 589.8 | 0.0010 |
| 2 | Li | 14,903.7 | 14,904.0 | 0.3 | 670.0 | 670.1 | 0.00002 |

In DPAL operation, pump radiation centered at the pump wavelength $\lambda_p$ of the $D_2$ transition, is directed into a gain cell containing (typically) a few microns vapor pressure of alkali atoms and an appropriate mixture of buffer gases (see below). The alkali atoms in the gain cell are selectively pumped to the $n^2P_{3/2}$ level, whereupon they collisionally relax to the lower-lying $n^2P_{1/2}$ level (i.e., the "upper laser level") before they can radiatively decay back to the ground level, as a result of the presence of the proper kind and amount of buffer gas. A typical buffer gas mixture might be 1–2 atm of helium and ~0.1 atm of a light molecular gas such as ethane. In addition to providing for the required kinetic relaxation of pump excitation from the $^2P_{3/2}$ level to the $^2P_{1/2}$ level, the buffer gas also serves to collisionally broaden the alkali D-transitions. For the typical buffer gas composition and pressure mentioned, these transitions become spectrally homogeneously broadened, and characterized by a predominantly Lorentzian line shape. With sufficiently intense pumping (governed by the pump transition cross-section) a population inversion is produced between the $n^2P_{1/2}$ upper laser level and the $n^2S_{1/2}$ lower, or terminal, laser level. The population inversion produced between the upper $n^2P_{1/2}$ and $n^2S_{1/2}$ levels permits laser action to occur on the $D_1$ transition at the wavelength $\lambda_1$ when the gain medium is placed between the mirrors of an appropriately designed laser resonator cavity. The required pump flux for efficient laser action in the $D_1$ transition of an alkali atom depends directly on the collision-broadened spectral width, effective transition cross-section, and the saturation flux of the pump and laser transitions, which in turn depend on the type and partial pressures of the buffer gases utilized.

The D-transition spectroscopic properties of the alkali vapor atoms have been studied [8], first as model systems of atomic structure, and more recently as preferred species for producing Bose-Einstein condensates. Likewise, also studied have been the collisional effects of all of the rare-gases and selected molecular gases on the spectroscopic and population kinetics of excited alkali atoms, including spectral broadening of the D-line transitions [9–12], collisional mixing rates of excited $^2P_{1/2,3/2}$ alkali atoms [13–16], and inelastic quenching rates of excited alkali atoms [17].

That a population inversion can be produced between the $^2P_{1/2}$ and $^2S_{1/2}$ levels was first observed experimentally and reported in 1982 [18]. Subsequently, many more detailed studies on this phenomenon have been carried out [16, 19–29]. Amplified spontaneous emission (ASE) arising from such population inversions have been reported for the $D_1$ transitions of Li, Na, K, and Rb, when their respective $D_2$ transitions were selectively excited with the radiation from a dye or titanium doped sapphire laser.

From Table 1, it is noted that the $D_2$ transitions for Cs, Rb, and K lie in the spectral region (760–850 nm) for which powerful and efficient high power laser diode arrays are commercially available. Therefore, these particular alkali atoms are utilized in preferred DPAL embodiments of the present invention.

The minimum waste heat necessary to produce an upper laser level excitation is the quantum energy defect. Table 2 lists the quantum energy defects for the two most practical diode pumped solid state lasers (Nd:YAG and Yb:YAG), along with the corresponding values for the Cs, Rb, and K alkali atoms. From Table 2, it can be seen that the alkali atoms possess quantum energy defects that are 2–10 times smaller than that for the solid state laser ions, and that amount of waste heat produced for each alkali atom excited will be reduced by this same factor, compared to N:YAG and YB:YAG lasers.

TABLE 2

| Laser Entity | Pump, (nm) | Pump, $E_2$ (cm$^{-1}$) | Laser, $\lambda_1$ (nm) | Laser, $E_1$ (cm$^{-1}$) | ΔE (cm$^{-1}$) | ΔE/E2 |
|---|---|---|---|---|---|---|
| Nd$^{3+}$ | 808 | 12,376 | 1064 | 9398 | 2978 | 0.24 |
| Yb$^{3+}$ | 941 | 10,627 | 1030 | 9709 | 918 | 0.086 |
| Cs | 852 | 11,732 | 894 | 11,178 | 554 | 0.047 |
| Rb | 780 | 12816 | 795 | 12,579 | 238 | 0.0185 |
| K | 766 | 13,043 | 770 | 12985 | 57.7 | 0.0044 |

Figure 2:
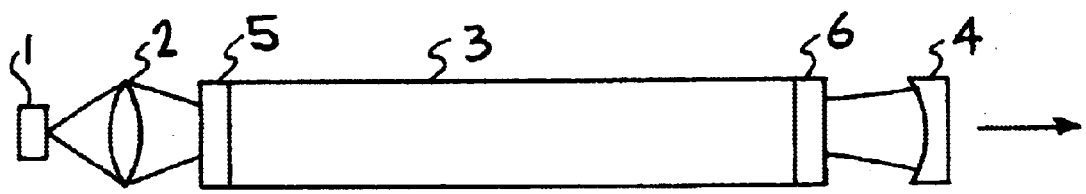
FIG. 2 shows the functional elements of a diode-pumped alkali vapor laser.

The basic, and simplest DPAL device configuration takes the form of an "end-pumped" configuration, accommodating the fact that a DPAL is a true three-level laser. FIG. 2 shows the functional elements of a DPAL and their relationships. In these designs the DPAL active medium is contained within a cell 3 of length "L", and whose transverse cross-section is generally circularly symmetric with radius "r", and having an aspect ratio, L/r, of typically >10. The cross-sectional shape of the gain cell may take many forms (circular, square, rectangular, or higher polygonal form), but for convenience here, it is assumed to have a circular cross-section. The cell may have an aspect ratio, such that by convention the cell might also be called a tube, capillary, hollow-waveguide, etc.

The gain cell is fitted with flat optical windows 5 and 6 at either end so as to contain the alkali atomic vapor. The window 5 at the pump end of the apparatus is coated on the exterior surface with a multilayer dielectric stack to form a mirror of the laser cavity. This mirror coating provides high transmission at the pump wavelength $\lambda_p$ and high reflectivity at the laser wavelength, $\lambda_1$. The window 6 at the other end of the cell (away from the laser diode pump array 1 and pump light coupling lens 2) is coated on its exterior surface with an anti-reflection layer for both pump and laser wavelengths. The laser cavity is completed with a second mirror 4 placed along the axis of the gain cell. This mirror is configured to permit only the fundamental (or other desired low-order) spatial mode of the resonator to oscillate. The output mirror 4 is coated to have a high reflectivity at the pump wavelength, to reflect pump radiation that was not absorbed during a first pass through the cell to return generally parallel to the cell axis for a second pass. The coating on the output mirror 4 is also designed to provide a reflectivity at the laser wavelength that optimizes the output coupling of laser radiation generated within the gain cell, and maximizes the efficiency of the DPAL.

To energize the DPAL, pump radiation provided by laser diode pump array 1 and centered at wavelength $D_2$ is coupled by lens 2 into the gain cell 3 generally along the cell axis, through the dichroic end mirror 5 on the cell, and double-passed through the cell following reflection from high reflectivity mirror 4 placed at the other end of the gain cell. Laser radiation generated within the gain cell at wavelength $\lambda_1$ matching the wavelength of the $D_1$ transition is extracted through the partially transmitting output mirror 4. In this device configuration, the cell window 6 may be replaced by a Brewster window to avoid the need to place an AR coating on the outer surface of the window, and to mitigate reflection loss from the uncoated inner surface of the window.

Figure 3:
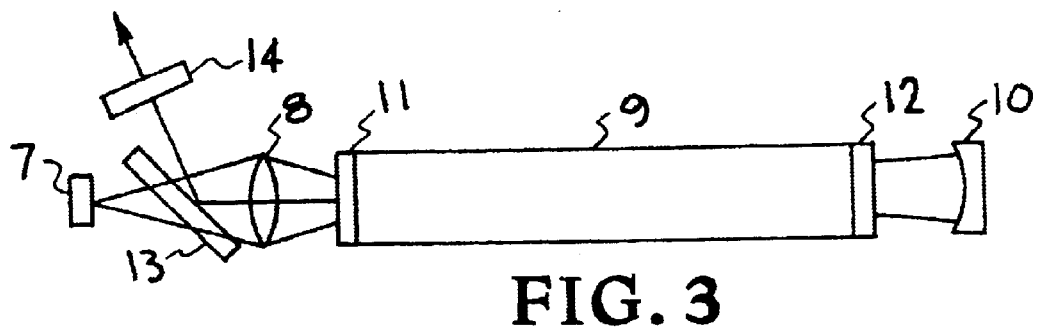
FIG. 3 shows a second embodiment of a diode-pumped alkali vapor laser using a thin-plate polarizer to couple pump (laser) radiation in and out of the laser cavity.

FIG. 3 shows an alternative preferred DPAL embodiment to that of FIG. 2. In this embodiment, a thin-film polarizer 13 is inserted between the diode pump array 7 and the alkali gain cell 9. The cell windows 11 and 12 are AR coated on their exterior surfaces to maximize transmission at pump and laser wavelengths. Polarized pump radiation is coupled into the apparatus by passing through the thin-film plate polarizer with high transmission, and is focused (by lens 8) within the cell to provide good spatial overlap with a low-order spatial mode of the laser cavity. The laser cavity is formed between the highly reflecting (at pump and laser wavelengths) mirror 10, and the output coupling mirror 14. Laser action in the pumped cell is set up in a polarization perpendicular to that of the pump radiation due to the presence of the thin-film plate polarizer within the laser cavity. The mirror reflectivity of the output coupling mirror 14 is adjusted to maximize the output power of laser radiation generated within the gain cell at the wavelength of the $D_1$ transition. This DPAL embodiment is especially useful when the active gain medium is potassium, for which the difference between pump and laser wavelengths is relatively small. A small wavelength difference makes difficult the fabrication of the dichroic pump-coupling mirror coating on window 5 (of FIG. 2) needed to implement the configuration of FIG. 2.

Figure 4:
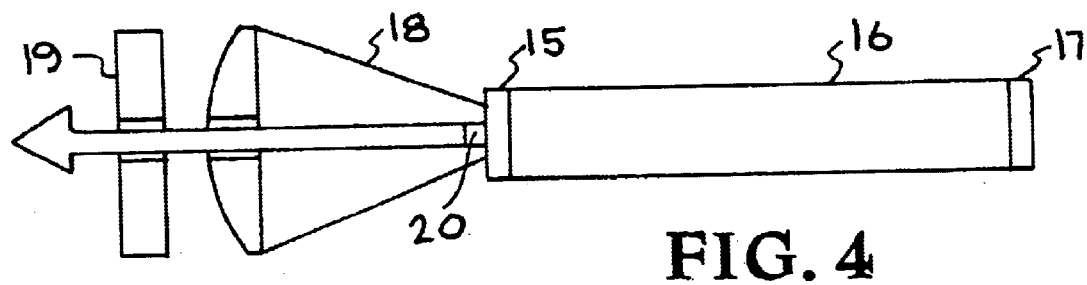
FIG. 4 shows a third embodiment of a diode-pumped alkali vapor laser using a hollow lens-duct to couple pump radiation into the laser cavity.

FIG. 4 shows yet another DPAL embodiment, especially for kilowatt class DPAL devices. In this configuration, the radiation from a 2-D laser diode pump array 19 is coupled into the gain cell 16 using a hollow lens-duct 18. The hollow lensing duct is described in U.S. Pat. No. 6,160,934 incorporated herein by reference. An unstable laser cavity is formed by dot-mirror 20 placed in the center of cell window 15, and curved mirror 17, also serving to close the gain cell. An anti-reflection coating is placed on cell window 15 in the annular region surrounding the high-reflectance dot mirror 20. Pump radiation is coupled into the gain cell in this annular region and propagates through the cell reflecting from a mirror coating placed on the outer barrel of the transparent-walled cell.

The three embodiments described here are to be taken as illustrative, as many other embodiments for DPAL type devices will be obvious to those skilled in the art based on the teachings herein.

In addition to converting the radiation from highly multimode diode pump arrays into low-order, high quality laser output radiation, the several nm wide spectral width of the diode pump array is converted into a much narrower spectral laser output because the collisionally-broadened gain transition of the alkali gain medium is homogeneously-broadened at the working pressure of a DPAL device. Spectrally narrow laser operation can be further enhanced by incorporating a birefringent filter (BRF) within the laser cavity.

Despite the fact that the spectral width of the collisionally-broadened $D_2$ pump transition (~0.07 nm, full width half maximum or FWHM) is spectally much narrower than the typical spectral width of a powerful pump array (>2–3 nm, FWHM), an unexpectedly high pump power absorption efficiency can be realized in a DPAL device because it proves possible to effectively couple much of the pump power into the alkali atoms through the Lorentzian wings of the pump transition. To gain insight into this unexpected result, calculations were made of the spectral propagation of the relatively broadband pump radiation through the DPAL cell, taking into account the spatial and spectral saturation of the alkali atom level populations along the pump beam within the gain cell. It is because the absolute magnitudes of the alkali atom pump transition peak cross-sections are so large that substantial and practical amounts of absorption of pump radiation can take place within the Lorentzian wings of the transitions, for practical DPAL design values.

Figure 5:
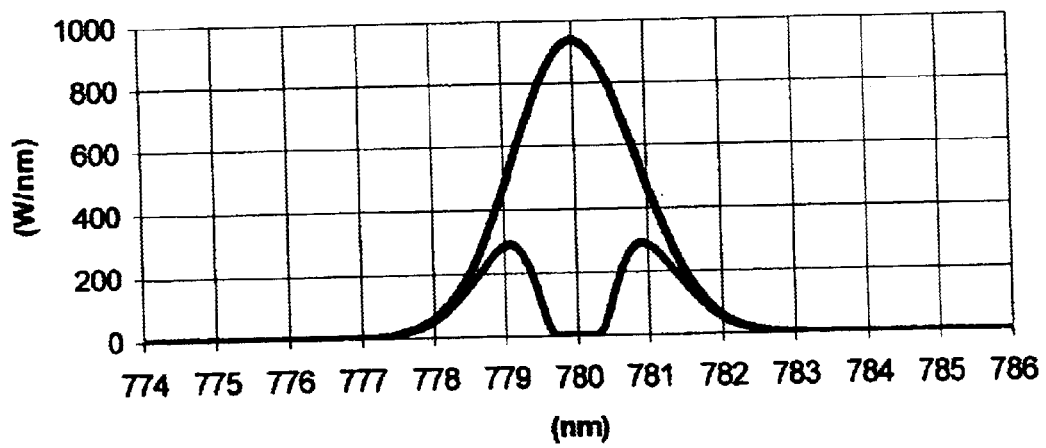
FIG. 5 shows exit and entrance pump flux at the $D_2$ pump transition of rubidium for a diode pump array spectral width of 2 nm, passing through a 6 cm long cell containing Rb atoms at a density of $5.9 \times 10^{14}$ atoms/cc and a buffer pressure of 2 atm of He gas. The entrance flux was 113 kW/cm$^2$.

To illustrate this point, model DPAL calculations were performed using the spectroscopic and kinetic parameters summarized in Table 3. Consider the case of a Rb DPAL device, typically designed with an Rb number density of $5.9 \times 10^{14}$ atoms/cc, a partial pressure of 2 atm helium, and ~0.1 atm of ethane. The ethane buffer gas assures an adequately fast relaxation of pump excitation to the $^2P_{1/2}$ upper laser level, and the helium gas broadens the Rb pump transition to a Lorentizian width of 0.09 nm, FWHM. Naively, one would expect to absorb only a small fraction of incident pump radiation spread over a typical (Gaussian) spectral width of 2 nm, FWHM. However, it is critical to note several important characteristic design parameters of practical DPAL devices can invalidate this first false impression. First, the peak absorption cross-section of the collisionally-broadened $D_2$ pump transition is $3.8 \times 10^{-13}$ cm$^2$, and the corresponding absorption saturation flux for this transition is about 24 W/cm$^2$. DPALs are designed to propagate pump fluxes many times this flux (typically many 10's of kW/cm$^2$) causing not only complete saturation of Rb atoms whose energies lie near the center of the Lorentzian transition, but also most of those lying in the far Loretzian wings as well. FIG. 5 shows a numerical calculation of the entrance and exit pump fluxes from a DPAL gain cell with the above stated gas mixture, and a 2 kW, 2 nm broad pump spectrum with an entrance flux of 113 kW/cm$^2$. In FIG. 5, the area falling between the entrance and exit flux curves, divided by the area under the entrance flux curve is the fraction of pump power absorbed. The cell length is 6 cm long. The calculated pump absorption is 1383 watts, or 69% of delivered power. The produced small signal gain coefficient is 0.39 nepers/cm, a value quite sufficiently high to efficiently extract laser radiation, and perform spatial mode-control using either stable or unstable resonators. The calculated output power is 1.01 kW, for a 50% power conversion efficiency.

TABLE 3

| Alkali Vapor Property | Units | Cs | Rb | K |
|---|---|---|---|---|
| Doppler Linewidth (FWHM): | Nm | Cs | Rb | K |
| Doppler-regime peak transition cross-sections | E − 11 cm$^2$ | | | |
| $D_2$, | | 5.1 | 2.7 | 1.8 |
| $D_1$ | | 2.9 | 1.35 | 0.9 |
| Doppler-regime saturation intensity | Watts/ cm$^2$ | | | |
| $D_2$, | | 0.15 | 0.34 | 0.4 |
| $D_1$ | | 0.25 | 0.67 | 0.8 |
| Collisional broadening coeffs. for He gas | nm/atm | | | |
| $D_2$, | | 0.051 | 0.045 | 0.034 |
| $D_1$ | | 0.055 | 0.036 | 0.026 |
| Collisional-regime peak transition cross-sections* | E − 13 cm$^2$ | | | |
| $D_2$, | | 2.4 | 3.8 | 5.0 |
| $D_1$ | 1.2 | 2.65 | 3.6 | |
| Collisional-regime saturation intensity* | watts/ cm$^2$ | | | |
| $D_2$, | | 32 | 24 | 19 |
| $D_1$ | | 61 | 34 | 26 |
| Collisional mixing cross-section for He g | E − 16 cm$^2$ | | | |
| $n^2P_{1/2-3/2}$ | | 0.0004 | ~0.1 | 60 |
| $n^2P_{3/2-1/2}$ | | 0.0004 | ~0.1 | 40 |
| Collisional mixing rate for 2 atm He gas* $n^2P_{1/2,3/2}$ levels | E + 8 sec$^{-1}$ | 0.0036 | 0.9 | 540 |

TABLE 3-continued

| Alkali Vapor Property | Units | Cs | Rb | K |
|---|---|---|---|---|
| Collisional mixing cross-section for $C_2H_6$ | E − 16 cm² | | | |
| $n^2P_{1/2-3/2}$ | | 16 | 77 | — |
| $n^2P_{3/2-1/2}$ | | 50 | 57 | — |
| Collisional mixing rate for 0.1 atm $C_2H_6$ gas $n^2P_{1/2,3/2}$ levels | E + 8 sec⁻¹ | 8.4 | 3.5 | — |
| Quenching cross-section of $n^2P_{1/2,3/2}$ levels by He | E − 19 cm² | <1.5 | <1.5 | <3 |
| Quenching rate of $n^2P_{1/2,3/2}$ levels for 2 at He gas | E + 8 sec⁻¹ | <0.01 | <0.014 | <0.027 |
| $D_2$, $D_1$ radiative decay rate | E + 8 sec⁻¹ | 0.33 | 0.36 | 0.36 |

*collisional-regime properties calculated for 2 atm of helium buffer gas.

References

1. Stephen Anderson, "Review and Forecast of the Laser Markets; Part I: Nondiode Lasers", Laser Focus World, PennWell Publishers, January, 2001.
2. Peter Loosen, "Lasers in Materials Processing", Advances in Lasers and Applications, pp287–317, Proc. 52$^{nd}$ Scottish Univ. Summer School in Physics, St. Andrews, September 1998.
3. W. Schulz and R. Poprawe, "Manufacturing with Novel High-Power Diode Lasers", IEEE J. Selected Topics in Quantum Electronics, 6, 696 (2000).
4. M. S. Albert and D. Balamore, "Development of Hyperpolarized Noble Gas MRI", Nuclear Instruments and Methods in Physics Research, A402, 441 (1998).
5. I. A. Nelson, B. Chann, and T. G. Walker, "Spin-exchanged Optical Pumping Using a Frequency-Narrowed, High-Power Diode Laser", Appl. Phys. Lett, 76, 1356 (2000).
6. H. Treusch, et. al., "compact High Brightness and High Power Diode Laser Source for Materials Processing", SPIE, 3945, 23 (2000).
7. G. Schmidt, et al., "New Diode Pumped Multi kW Solid State Laser-Modeling of the Performance in Comparison with Experimental Results", SPIE, Vol 3613, pp8–15, (1999).
8. P. S. Doidge, "A Compendium and Critical Review of Neutral Atom Resonance Line Oscillator Strengths for Atomic Absorption Analysis", Spectrochmica Acta., 50B, 209 (1995)
9. S. Ch'en and M Takeo, "Broadening and Shift of Spectral Lines Due to the Presence of Foreign Gases", Rev. Mod. Phys., 29, 20 (1957).
10. W. R. Hindmarsh and J. M. Farr, "Collision Broadening of Spectral Lines by Neutral Atoms", Prog. In Quantum Electronics, 2, 141 (1972)
11. R. O. Garrett and S. Y. Ch'en, "Pressure Effects of Foreign Gases on the Absorption Lines of Cesium. II. The Effects of Helium on the First Two Members of the Principal Series", Phys. Rev., 144, 66 (1966).
12. M. D. Rotondaro and G. P. Perram, "Collisional Broadening and Shift of the Rubium $D_1$ and $D_2$ Lines by Rare Gases, $H_2$, $D_2$, $N_2$, $CH_4$, and $CF_4$", J. Quant Radiat. Transfer, 57, 497 (197).
13. L. Krause, "Collisional Excitation Transfer Between the $^2P_{1/2}$ and $^2P_{3/2}$ Levels in Alkali Atoms", Applied Optics, 5, 1375 (1966).
14. E. S. Hrycyshyn and L. Krause, "Inelastic Collisions Between Excited Alkali Atoms and Molecules, VII. Sensitized Fluorescence and Quenching in Mixtures of Rubidium with $H_2$, HD, $D_2$, $N_2$, $CH_4$, $CD_4$, $C_2H_4$, and $C_2H_6$.", Can. J. Phys., 48, 2761 (1970).
15. E. Walentynowicz, et. al., "Inelastic Collisions Between Excited Alkali Atoms and Molecules X. Temperature Dependence of Cross Sections for $^2P_{1/2}$–$^2P_{3/2}$ Mixing in Cesium, Induced in Collisions with Deuterated Hydrogens, Ethanes, and Propanes", Can. J. Phys., 52, 589 (1974).
16. Z. Konefal, "Observation of Collision Induced Processes in Rubium-Ethane Vapour", Optics Communications, 164, 95 (1999).
17. E. Spellier, B. Staudenmayer, and V. Kempter, "Quenching Cross Sections for Alkali-Inert Gas Collisions", Z. Phys., A291, 311 (1979).
18. B. A. Glushko, M. E. Movsesyan, and T. O. Ovakimyan, "Processess of Stimulated Electronic Raman Scattering and Stimulated Resonance Emission in Potassium Vapor in the Presence of a Buffer Gas". Opt. Spectrosc (USSR), 52, 458 (1982).
19. A. A. Dabagyan, M. E. Movsesyan, T. O. Ovakimyan, and S. V. Shmavonyan, "Stimulated Processes in Potassium Vapor in the Presence of a Buffer Gas", Sov. Phys., JETP, 58, 700 (1983).
20. A. A. Dabagyan, M. E. Movsesyan, T. O. Ovakimyan, and S. V. Shmavonyan, "Development over time in the Induced Resonant Processes in Potassium Vapor, in the Presence of Collisions", Izvestiya Alademii Nauk, SSR, Seriya Fizicheskaya, 47, 1609 (1983).
21. S. N. Atutov, A. I. Plekhanov, and A. M. Shalagin, "Superluminosity on the Resonant Transition of Na Atoms under Optical Excitation", Opt. Spectrosc (USSR), 56, 134 (1984).
22. M. E. Movsesyan, T. O. Ovakimyan, and S. V. Shmavonyan, "Stimulated Processes in a Mixture of Rubidium Vapor and Buffer Gas Under Two Photon Excitation", Opt Scpetrosc (USSR), 61, 285 (1986).
23. J. Czub, J. Fiutak, and W. Miklaszewski, "On Collision-Induced Amplified Emission of Alkali Atoms", Z. Phys., D3, 23 (1986).
24. A. M. Davtyan, M. E. Movsesyan, A. V. Papoyan, and S. V. Shmavonyan, "Laser Resonance Radiation at the Atomic-Potassium D1 Line", Opt. Spectrosc (USSR), 66, 686 (1989).
25. Z. Konefal and M. Ignaciuk, "Stimulated Collision Induced Processes in Sodium Vapor in the Presence of Helium", Appl. Phys., B51, 285 (1990).
26. Z. Konefal and M. Ignaciuk, "Observation of Collision-Induced Amplified Emission in Na-Noble-Gas System", Z. Phys., D27, 49 (1993).
27. Z. Konefal and M. Ignaciuk, "Investigation of Collisionally Induced Stimulated Scattering in Sodium Vapor with Temporal and Spectral Resolution", Appl. Phys., B61, 101 (1995).
28. J. Czub, J. Fiutak, and W. Miklaszewski, "Influence of Resonant Pulse Propagation on Collision-Induced Stimulated Effects in the $^2S_{1/2,}$–$^2P_{1/2/,3/2}$ System", Phys. Rev., A54, 746 (1996).
29. Z. Konefal and M. Ignaciuk, "Stimulated Processes in Sodium Vapor in the Presence of Molecular Buffer Gas Systems", Opt And Quantum Electronics, 28, 169 (1996).
30. R. J. Beach, "CW Theory of Quasi-Three-Level End-Pumped Laser Oscillators", Opt. Commun., 123, 385 (1995).

All of the references cited herein are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. An alkali vapor laser, comprising:
   an optical cavity resonant at a wavelength $\lambda_1$, corresponding to a wavelength of the $D_1$ transition of an alkali atomic vapor;
   a gain medium within said optical cavity, said gain medium comprising a mixture of at least one buffer gas and said alkali atomic vapor having said $D_1$ transition wavelength matching said wavelength $\lambda_1$ of said optical cavity, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels; and
   a pump laser emitting at wavelength $\lambda_2$ with an emission spectral width within the range from 1–6 nm (FWHM), for optically pumping said laser gain medium at a wavelength of a $D_2$ transition of said alkali vapor, including optical pumping in the Lorentzian spectral wings of said $D_2$ transition, generating laser emission output at the wavelength $\lambda_1$ of the $D_1$ transition of the alkali vapor.

2. The alkali vapor laser of claim 1, wherein said optical cavity is formed by an input mirror and an output mirror.

3. The alkali vapor laser of claim 2, wherein said output mirror of said optical cavity is partially transmitting at a wavelength $\lambda_1$ matching the wavelength of said $D_1$ transition of the said alkali vapor, permitting out-coupling of laser radiation generated within said optically pumped alkali vapor laser at a wavelength of $\lambda_1$, wherein said output mirror is substantially highly reflecting at a wavelength $\lambda_2$ matching the wavelength of the $D_2$ (pump) transition of said alkali vapor.

4. The alkali vapor laser of claim 2, wherein said input mirror of said optical cavity is a dichroic mirror, substantially transmitting radiation at a wavelength $\lambda_2$ matching the wavelength of the $D_2$ (pump) transition of said alkali vapor, and substantially reflecting at a wavelength $\lambda_1$ matching the wavelength of the $D_1$ transition of said alkali vapor.

5. The alkali vapor laser of claim 2, further comprising a thin-film polarizer plate optical element placed within said optical cavity for coupling linearly-polarized radiation at wavelength $\lambda_2$ from said pump laser into said gain medium, generally along the cell axis, wherein said linearly-polarized radiation couples into said gain medium without having to pass through either of said input mirror or said output mirror.

6. The alkali vapor laser of claim 5, wherein laser radiation at wavelength $\lambda_1$ is generated in a linear polarization that is oriented orthogonally with respect to the polarization of the pump radiation.

7. The alkali vapor laser of claim 1, wherein said pump laser comprises at least one semiconductor diode laser emitting at said wavelength $\lambda_2$.

8. The alkali vapor laser of claim 7, wherein said at least one semiconductor diode laser emits at a wavelength of ~852 nm.

9. The alkali vapor laser of claim 7, wherein said at least one semiconductor diode laser comprises material selected from the group consisting of AlGaAs and InGaAsP.

10. The alkali vapor laser of claim 7, wherein said at least one semiconductor diode laser emits at a wavelength of ~780 nm.

11. The alkali vapor laser of claim 1, further comprising an optical cell through which said mixture flows or is contained.

12. The alkali vapor laser system of claim 11, wherein said optical cell comprises a main body with a mirror at a first end of said main body and a window at a second end of said main body, wherein said optical cavity includes a dot-mirror placed near the center of said window, wherein said end mirror and said dot-mirror together form said laser cavity, wherein said window comprises an anti-reflection coating, wherein said pump laser comprises a laser diode array, wherein said alkali vapor laser further comprises a hollow lens duct positioned to direct pump radiation from said pump laser through said window and into said optical cell.

13. The alkali vapor laser of claim 1, wherein said alkali vapor is selected from the group consisting of cesium (Cs), rubidium (Rb), potassium (K), sodium (Na), and lithium (Li).

14. The alkali vapor laser set forth in claim 1, wherein said at least one buffer gas is selected from the group consisting of rare gases and light molecular gases.

15. The alkali vapor laser set forth in claim 14, wherein said rare gases are selected from the group consisting of xenon, krypton, argon, neon, and helium.

16. The alkali vapor laser set forth in claim 14, wherein said light molecular gases are selected from the group consisting of hydrogen, methane, ethane, propane, and their deuterated analogues.

17. The alkali vapor laser of claim 1, wherein the alkali vapor is cesium and the buffer gases are helium and ethane.

18. The alkali vapor laser system of claim 1, wherein the said optical cavity of claim 1 is resonant at a wavelength of ~894 nm.

19. The alkali vapor laser of claim 1, wherein the alkali vapor is rubidium and the buffer gases are helium and ethane.

20. The alkali vapor laser system of claim 1, wherein the said optical cavity is resonant at a wavelength of ~795 nm.

21. The alkali vapor laser of claim 1, wherein said alkali vapor comprises potassium and wherein said at least one buffer gas is selected from the group consisting of helium and argon.

22. The alkali vapor laser of claim 1, wherein said at least one semiconductor diode laser emits at a wavelength of ~767 nm.

23. The alkali vapor laser system of claim 1, wherein the said optical cavity is resonant at a wavelength of ~770 nm.

24. A method for converting spectrally broadband radiation from a pump semiconductor diode laser array into spectrally narrowband output laser radiation, comprising the steps of:
   pumping, with a pump laser having an emission spectral width within the range from 1–6 nm (FWHM), an alkali/buffer gas gain mixture at a wavelength $\lambda_2$ of a pressure-broadened $D_2$ transition of the alkali vapor, wherein said mixture is optically pumped well into the Lorentzian spectral wings of the $D_2$ transition; and
   extracting spectrally narrowband laser radiation generated on the spectrally-homogeneous $D_1$ transition of said alkali vapor, wherein said buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

25. A method for converting the substantially-divergent, multi-spatial-mode of semiconductor diode laser array pump radiation into a near diffraction-limited, near-single-spatial-mode, coherent laser radiation, comprising the steps of:

depositing pump radiation at a wavelength $\lambda_2$ matching a wavelength of a $D_2$ transition of an alkali/buffer-gas gain mixture in a certain defined spatial volume (within the gain mixture cell placed in an optical cavity), including optical pumping in the Lorentzian spectral wings of said $D_2$ transition, wherein said pump radiation is provided by a multi-spatial-mode semiconductor diode laser array comprising an emission spectral width within the range from 1–6 nm (FWHM);

spatially over-lapping said volume with the fundamental mode of the alkali vapor laser cavity, designed to possess substantially higher losses for higher order spatial modes than for the fundamental mode; and extracting laser output power in the fundamental spatial mode of the laser cavity by providing the proper amount of transmission of radiation at an output wavelength $\lambda_1$ matching a wavelength of a $D_1$ transition of said alkali vapor, wherein said at least one buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

* * * * *